May 14, 1929.                    J. G. ROUNTREE                    1,713,396
                                GARDENING IMPLEMENT
                    Filed June 7, 1927            3 Sheets-Sheet 2
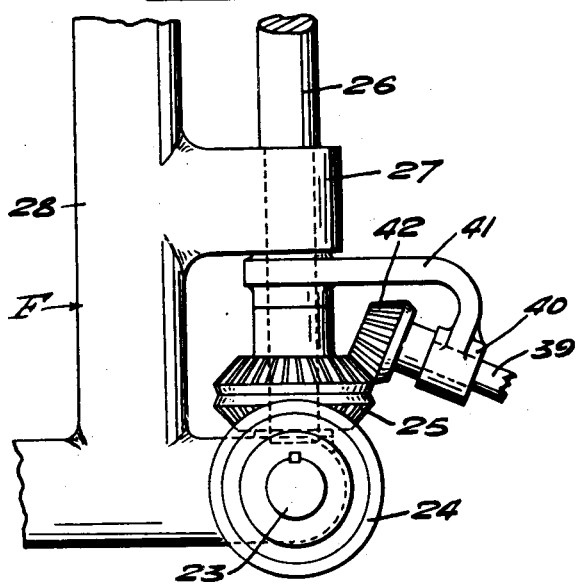
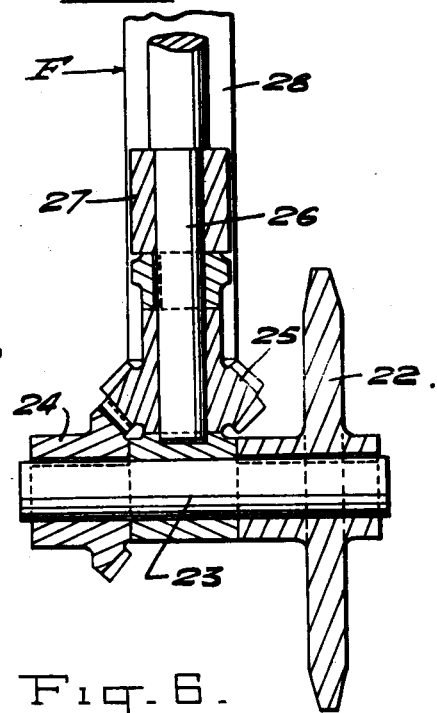
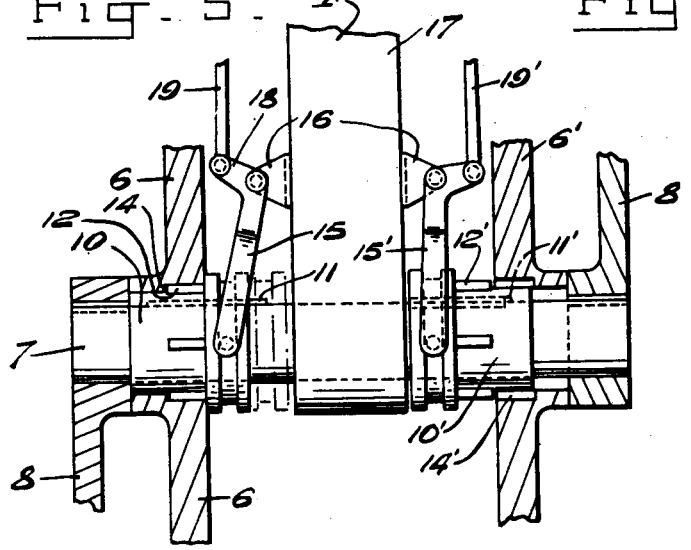
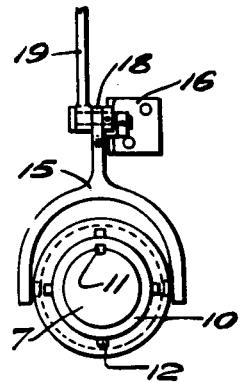
Inventor
J. G. ROUNTREE
By Watson E. Coleman.
Attorney

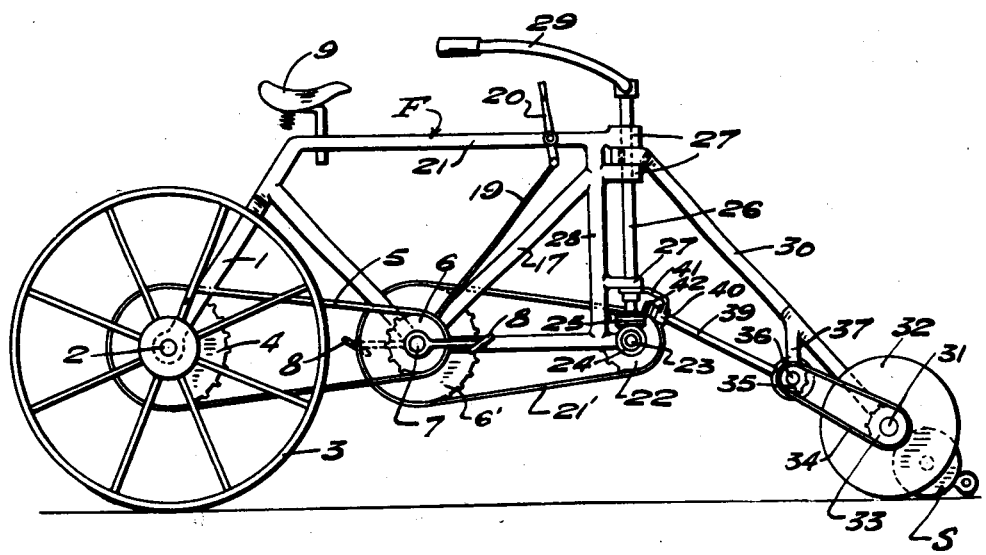

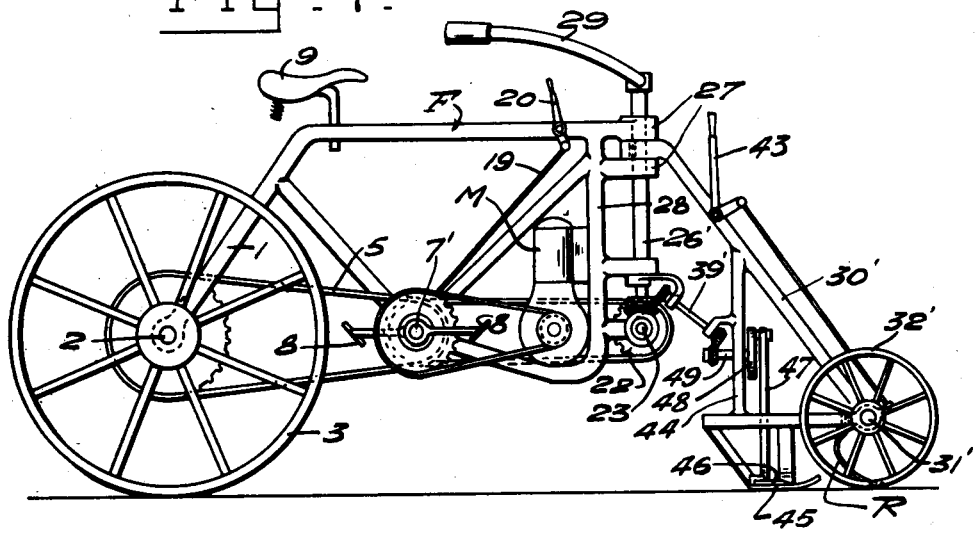
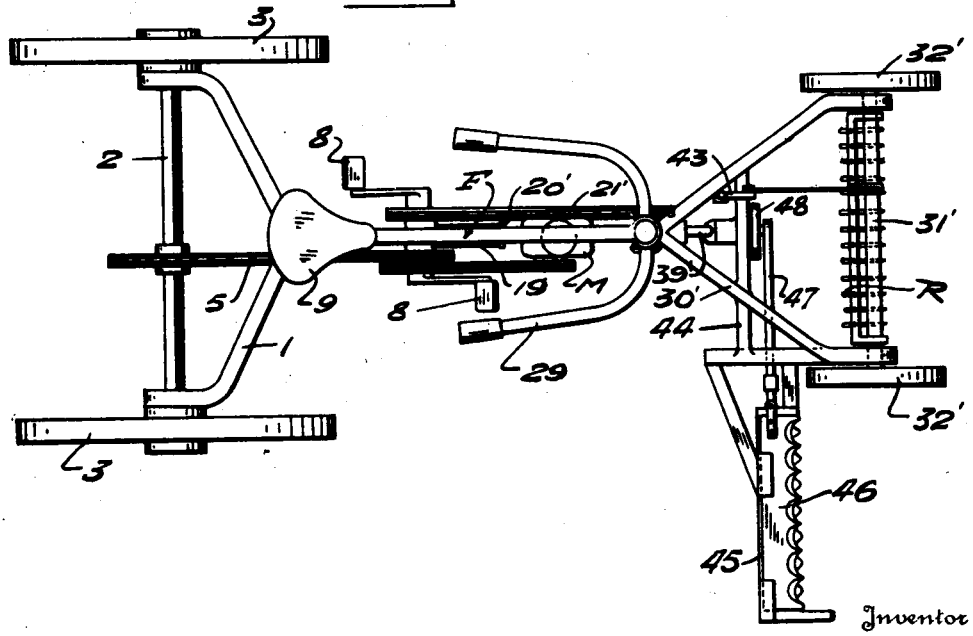

Patented May 14, 1929.

1,713,396

UNITED STATES PATENT OFFICE.

JOSEPH G. ROUNTREE, OF BEEVILLE, TEXAS.

GARDENING IMPLEMENT.

Application filed June 7, 1927. Serial No. 197,123.

This invention relates to gardening implements and it is an object of the invention to provide a device of this kind wherein the implement is driven by a cycle.

Another object of the invention is to provide an implement of this kind including a cycle of desired character provided with a driving medium together with a garden tool of desired type and means whereby a movable part of the garden tool, if any, may be readily operated from the driving means for the cycle.

An additional object of the invention is to provide an implement of this kind including a cycle provided with driving means together with a garden tool operatively engaged with the cycle and which provides a supporting medium for the cycle.

The invention consists in the details of construction and in the combination and arrangement of the several parts of my improved gardening implement whereby certain important advantages are attained and the device rendered simpler, less expensive and otherwise more convenient and advantageous for use, as will be hereinafter more fully set forth.

The novel feature of my invention will hereinafter be definitely claimed.

In order that my invention may be the better understood, I will now proceed to describe the same with reference to the accompanying drawings, wherein:—

Figure 1 is a view in side elevation illustrating a gardening implement constructed in accordance with an embodiment of my invention, a second type of garden tool being diagrammatically indicated by broken lines;

Figure 2 is a view in top plan of the structure illustrated in Figure 1;

Figure 3 is an enlarged fragmentary view illustrating a portion of the driving means for the forwardly disposed shaft comprised in my improved implement;

Figure 4 is a vertical sectional view taken through the structure illustrated in Figure 1 with portions in elevation;

Figure 5 is an enlarged fragmentary view partly in section and partly in elevation illustrating the drive shaft of the cycle and the parts concomitant thereto as herein embodied;

Figure 6 is a view in end elevation of one of the clutch members herein employed;

Figure 7 is a view in side elevation illustrating a gardening implement constructed in accordance with a further embodiment of my invention;

Figure 8 is a view in top plan of the structure as illustrated in Figure 7.

As disclosed in the accompanying drawing, F denotes the frame of a cycle including a rearwardly disposed fork 1 which provides a mounting for the rear axle 2. The extremities of this axle 2 have fixed thereto the drive wheels 3.

The central portion of the axle 2 has fixed thereto, as herein disclosed, a sprocket wheel 4 around which passes the sprocket chain 5 also operatively engaged with a sprocket wheel 6 loosely mounted on an end portion of a drive shaft 7. This drive shaft 7 is rotatably supported by the lower portion of the frame F and, as herein disclosed, has secured to the extremities thereof the pedals 8 whereby the shaft may be driven by foot power by the occupant of the seat 9 suitably mounted upon the frame F.

I do not, however, wish to be understood as limiting myself to the particular manner whereby the drive shaft 7 may be operated as a suitable motor structure may be employed if desired. As this motor feature forms no part of my present invention it is not thought necessary that the same be described and illustrated.

The sprocket wheel 6 is directly mounted on a sleeve 10 which is mounted for sliding movement on the shaft 7 but keyed thereto, as at 11, for rotation therewith. This sleeve 10 constitutes a movable clutch member and is provided at its inner portion with the transversely disposed outstanding ribs 12 which are adapted to be received within suitable recesses 14 provided in the inner portion of the hub or center of the sprocket wheel 6. By this arrangement when the sleeve 10 is moved outwardly with respect to the shaft 7 the sprocket wheel 6 is locked thereto for rotation with the shaft 7. The ribs 12 are of a length less than that of the sleeve 10 so that when the sleeve 10, or clutch member as it may be called, is moved inwardly the ribs 12 are free of the sprocket wheel 6 thereby permitting the shaft 7 to have rotation independently of the sprocket wheel 6.

Coacting in a well known manner with the inner portion of the sleeve or clutch member 10 is a yoke 15 supported for requisite swinging movement by the brackets 16 secured to an adjacent bar 17 comprised in the frame structure of the cycle. The pivoted portion of the yoke 15 is provided with an angular extension 18 with which is operatively engaged a rod 19. This rod 19 is also operatively engaged with a lever 20 pivotally mounted upon the top bar 21 of the frame but at a point adjacent the forward end thereof. This lever may be readily engaged by the occupant of the seat 9 and operated to throw the sleeve or clutch member 10 into or out of engagement with the sprocket wheel 6 as may be preferred.

The opposite end portion of the shaft 7 has slidably mounted thereon a sleeve or clutch member 10' but keyed to the shaft, as at 11', for rotation therewith. This sleeve is also provided with the outstanding and longitudinally disposed ribs 12' which coact with the recesses 14' provided in the hub portion of the second sprocket wheel 6'. This sleeve or clutch member 10' coacts with the sprocket wheel 6' in substantially the same manner and for the same purpose as the sleeve or clutch member 10 as hereinbefore referred to and this sleeve or clutch member 10' is operated as desired through the medium of the swinging yoke 15', the rod 19' and lever 20'.

The sprocket wheel 6' has operatively engaged therewith a sprocket chain 21' which is also operatively engaged with a sprocket wheel 22 fixed to an end portion of a shaft 23 rotatably supported by the lower forward portion of the frame F.

The opposite end portion of the shaft 23 has fixed thereto a gear 24 which meshes with the lower portion of a double bevel gear 25. This gear 25 is loosely mounted on the lower portion of a vertically disposed steering post 26 rotatably held by the forwardly directed bearings 27 carried by the vertical front bar 28 comprised in the frame F. The upper portion of the post 26 is provided with the handle bars 29 adapted to be grasped by the occupant of the seat 9 and to be operated in a conventional manner.

The upper portion of the post 26 has fixed thereto between two closely adjacent bearings 27 the upper end portion of a forwardly and downwardly disposed yoke-like member 30 which has its lower portion operatively engaged with the shaft 31 comprised in a supplemental frame structure S. The end portions of the shaft 31 have fixed thereto the ground engaging wheels 32. Each end portion of the shaft 31 also has fixed thereto, as illustrated in Figures 1 and 2, a sprocket wheel 33 with which is operatively engaged a sprocket chain 34 also operatively engaged with a sprocket 35 fixed to an end portion of a shaft 36. This shaft 36, as herein disclosed, is rotatably supported by arms 37 depending from the yoke-like member 30.

In Figures 1 and 2 is illustrated by full lines a conventional lawn mower structure but, if preferred, the cutting reel of the mower may be removed and a garden plow may be operatively engaged with the frame S. It is also to be understood that if desired other garden tools may be employed with equal facility such as a rake or a mower embodying a reciprocating blade. However, as each of these particular tools in itself is well known it is not thought necessary that the same be particularly described and illustrated.

Operatively engaged, as at 38, through the medium of a differential or otherwise is an end portion of a forwardly and downwardly inclined shaft 39 the upper portion of which being rotatably supported by a bearing 40 carried by an outstanding bracket 41 fixed to the lower portion of the steering post 26. The upper or inner end portion of the shaft 39 has fixed thereto a bevel gear 42 meshing with the upper portion of the gear 25 so that when the upper portion of the gear 25 is in engagement with the clutch member 10', the shaft 36 will be the sprocket wheel 6', the shaft 36 will be caused to rotate for the purpose of driving the requisite movable part of a garden tool associated with the frame S, such as for example, the shaft 31 for effecting not only a positive rotation of the wheels 32 but the desired driving of the cutting reel when a lawn mower is employed.

In the embodiment of my invention as illustrated in Figures 7 and 8, the shaft 7' is driven from the motor M of a type generally employed in connection with motorcycles, thus providing an embodiment of my invention which is power driven.

A yoke like member 30' is operatively engaged with the steering post 26' in substantially the same manner as hereinbefore recited in connection with the member 30. This member 30' is operatively engaged with a shaft 31' on the extremities of which are operatively engaged the ground engaging wheels 32'. The shaft 31' is adapted to have operatively engaged therewith a conventional rake structure R adapted to be raised or lowered through the instrumentality of the lever 43 herein disclosed as operatively mounted upon the upper portion of the member 30'.

It is also desired that there be operatively engaged with the member 30' a frame structure 44 for a mower 45 including a reciprocating cutting blade and associated mechanism of a conventional character. When the mower structure is employed, the reciprocating blade 46 has its pitman 47 operatively engaged with a disc 48 carried by the shaft 49. This shaft 49 is operatively supported by the frame 44 and is in driven connection with the shaft 39'. This shaft 39' is driven from the shaft 7' in the same manner as hereinbefore referred to with respect to the shaft 39 and, therefore, a repetition of such structure at this time is believed to be unnecessary.

From the foregoing description it is thought to be obvious that a gardening implement constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. An implement of the class described comprising a frame, a supporting means associated with one end portion thereof, a steering post carried by the opposite end portion, a rigid member secured to the steering post, a garden tool supported by said rigid member and coacting with said member to provide a further supporting means for the frame, a member rotatably mounted on the steering post, a movable part comprised in the tool, a driving connection between the rotatable member on the steering post and the movable part of the tool, and means for rotating the member on the steering post.

2. An implement of the class described comprising a frame, a ground engaging means for supporting an end portion on the frame, a steering post rotatably supported by the opposite end portion of the frame, a forwardly and downwardly disposed member engaged with the post for turning movement therewith, a ground engaging member carried by said first named member and providing a support for the adjacent end portion of the frame, and means carried by the steering post for turning the steering post to swing the first named member and the ground working member to control the direction of travel of the implement.

3. An implement of the class described comprising a frame, a ground engaging means for supporting an end portion of the frame, a steering post rotatably supported by the opposite end portion of the frame, a forwardly and downwardly disposed member engaged with the post for turning movement therewith, a ground engaging member carried by said first named member and providing a support for the adjacent end portion of the frame, said ground engaging member including a movable part, an arm depending from the second member, a shaft rotatably supported by said arm, a driving connection between the shaft and movable member, a member freely mounted on the steering post for rotation therearound, a driven connection between the member on the post and the shaft, and means for rotating the member on the post.

4. An implement of the class described comprising a frame, a ground engaging means for supporting an end portion of the frame, a steering post rotatably supported by the opposite end portion of the frame, a forwardly and downwardly disposed member engaged with the post for turning movement therewith, a ground engaging member carried by said first named member and providing a support for the adjacent end portion of the frame, said ground engaging member including a movable part, an arm depending from the second member, a shaft rotatably supported by said arm, a driving connection between the shaft and movable member, a gear freely mounted on the shaft for rotation therearound, means for driving the gear, a second shaft operatively engaged with the gear and with the first named shaft, and a bearing for the shaft fixed to the steering post and movable therewith.

5. An implement of the class described comprising a frame, ground engaging means supporting the rear end, a steering post at the forward end, a forwardly and downwardly extending member secured to the post for turning movement therewith, a lawn mower secured to the lower end of said member, means for driving the mower by movement of the frame, and means for turning the steering post, the member and mower to guide the implement.

In testimony whereof I hereunto affix my signature.

JOSEPH G. ROUNTREE.